2,933,531

SUBSTITUTED 1-(α-METHYLPHENETHYL)-2,2-DIMETHYLHYDRAZINE

Edward L. Schumann, Portage Township, Kalamazoo County, Mich., assignor to The Upjohn Company, Kalamazoo, Mich., a corporation of Delaware No Drawing. Application July 20, 1959
Serial No. 828,016

5 Claims. (Cl. 260—569)

This invention relates to novel derivatives of hydrazine and is more particularly concerned with derivatives of 1-α-methylphenethyl-2,2-dimethylhydrazine and acid addition salts thereof, and with a process for their preparation.

The novel compounds of the invention can be represented by the following general formula:

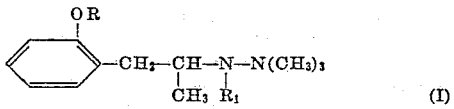

wherein R represents alkyl containing from 1 to 3 carbon atoms, inclusive, and $R_1$ is selected from the class consisting of hydrogen and alkyl containing from 1 to 3 carbon atoms, inclusive.

The term "alkyl containing from 1 to 3 carbon atoms, inclusive," includes methyl, ethyl, propyl and isopropyl groups.

The compounds of the invention having the Formula I above can exist in free base form in the form of acid addition salts. It is to be understood that both the free base form and the acid addition salts fall within the scope of the present invention.

The novel compounds of the invention exhibit pharmacological activity. Illustratively, the compounds of the invention are active as drug potentiators, for example, in prolonging the effect of anesthetics, analgesics, sedatives and hypnotics. Illustratively, the compounds of the invention prolong hexobarbital-induced sleeping time in mice.

The novel compounds of the invention having the Formula I above in which $R_1$ represents hydrogen, can be prepared in a convenient manner by reacting the appropriate o-alkoxyphenylacetone with 1,1-dimethylhydrazine to form the corresponding o-alkoxyphenylacetone hydrazone, and subjecting the latter to catalytic hydrogenation to obtain the desired compound having the Formula I above. The reaction of the o-alkoxyphenylacetone with the 1,1-dimethylhydrazine can be carried out advantageously by mixing the reactants in solution in an inert solvent such as methanol, ethanol, isopropyl alcohol, ethyl acetate, dioxane, and the like. The reaction can be carried out at room temperature (about 20 to 30° C.); but in order to increase the reaction rate it is preferred to employ elevated temperatures, such as the boiling point of the mixtures at atmospheric pressure. If desired, the hydrazone so formed can be isolated, for example, by fractional distillation in vacuo. However, it is generally unnecessary to isolate or purify the hydrazone. The reaction mixture obtained as described above can be subjected directly to catalytic hydrogenation using catalysts such as platinum oxide. Preferably the reaction mixture obtained in the formation of the hydrazone is acidified, for example, by the addition of at least a stoichiometric amount of acetic acid, before being subjected to hydrogenation. After hydrogenation is complete the desired compound having the Formula I above in which $R_1$ represents hydrogen can be isolated from the reaction mixture, for example, by filtration of the mixture to remove the catalyst and evaporation of the filtrate to dryness. The crude product so obtained can be purified by conventional procedures, for example, by conversion to the free base folowed by distillation or by conversion to a crystalline acid addition salt.

The o-alkoxyphenylacetones which are employed as starting materials in the process described above, can themselves be obtained readily from the corresponding o-alkoxybenzaldehydes by the process described in U.S. Patent 2,557,051 for the preparation of o-methoxyphenylacetone from o-methoxybenzaldehyde by condensation of the latter with nitroethane in the presence of butylamine, followed by reductive hydrolysis of the intermediate nitropropene. The o-alkoxybenzaldehydes employed as starting materials in this process, many of which have been described in the literature, can be obtained readily by etherification of salicylaldehyde, for example, by treatment of the sodium derivative of salicylaldehyde with the appropriate alkyl halide.

The compounds of the invention having the Formula I in which $R_1$ represents alkyl can be obtained by direct alkylation of the compounds having the Formula I in which $R_1$ is hydrogen. The alkylation can be effected in a convenient manner by reaction of the sodium derivative of a compound having the Formula I, in which $R_1$ is hydrogen, with the appropriate alkyl halide. The reaction is preferably conducted in the presence of an inert solvent such as ether, benzene, toluene, and the like. In the case of the compounds in which $R_1$ is methyl the alkylation can be carried out conveniently by treating the compound having the Formula I, in which $R_1$ is hydrogen, with formaldehyde in the presence of 98% formic acid according to the procedure described by Clarke et al., J. Am. Chem. Soc. 55, 4571 (1933). Preferably the reaction is carried out at elevated temperature, for example, at the boiling point of the reaction mixture. The desired product can be isolated from the reaction mixture by conventional procedures, for example, by solvent extraction after basification of the reaction mixture. The product so obtained can be purified by conventional procedures, for example, by distillation under reduced pressure or by conversion to an acid addition salt.

The compounds of the invention having the Formula I in which $R_1$ represents alkyl can also be obtained by converting an amine having the general formula:

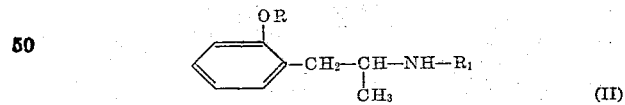

wherein R and $R_1$ have the significance hereinbefore defined, to the corresponding N-nitroso compound, reducing the latter to the corresponding compound having the formula:

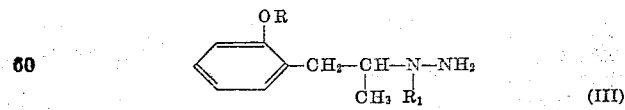

wherein R and $R_1$ are as hereinbefore defined, and subjecting the latter compound to dimethylation. The conversion of the Compound II to the corresponding N-nitroso compound can be effected in a convenient manner by treating an aqueous solution of the Compound II, preferably in the form of an acid addition salt such as the hydrochloride, sulfate and the like, with nitrous acid, for example by the addition of a nitrite such as sodium nitrite, barium nitrite and the like, in the presence of a mineral acid such as sulfuric acid, hydrochloric acid and the like. The reaction is preferably carried out at a temperature within the range of about 5° C. to about 20° C. Advantageously the nitrite is employed in excess of the molar proportion and preferably the nitrite is employed in an amount representing about 2.5 times the molar proportion. The N-nitroso compound so obtained can be isolated from the reaction mixture by conventional procedures, for example, by extraction in a suitable solvent such as ether, and is generally employed, without purification, in the next stage of the synthesis. The N-nitroso compound can be reduced to the compound having the Formula III in a convenient manner by treatment with lithium aluminum hydride in a suitable solvent such as anhydrous ether. The reduction is carried out preferably at elevated temperatures, for example at the reflux temperature of the reaction mixture. Advantageously the amount of lithium aluminum hydride present in the reaction mixture is slightly in excess of the equimolar proportion based on the N-nitroso compound. The desired compound having the Formula III can be isolated from the reaction mixture by decomposing the latter with water, isolating and drying the solvent phase, and removing the solvent by distillation. The product so obtained can be purified by conventional procedures, for example, by distillation.

The compound having the Formula III can be converted to the compound having the Formula I above ($R_1$=alkyl) by dimethylation. The dimethylation is accomplished readily by treating the compound having the Formula III with an excess of formaldehyde in 98% formic acid solution using the procedure described by Clarke et al. (supra). The reaction is carried out preferably by heating the mixture under reflux and the desired compound having the Formula I above ($R_1$=alkyl) can be isolated from the reaction mixture by subjecting the latter to solvent extraction after basification. The compound so isolated can be purified by conventional procedures, for example, by distillation under reduced pressure or by conversion to a crystalline acid addition salt.

The compounds having the Formula II above which are employed as starting materials in the above-described synthesis can be obtained readily by reductive amination of the corresponding o-alkoxyphenylacetone using the appropriate alkylamine according to the procedure described by Heinzelman, J. Am. Chem. Soc. 75 921 (1953), for the preparation of N-[β-(o-methoxyphenyl)-isopropyl]methylamine from o-methoxyphenylacetone and methylamine.

The acid addition salts of the invention comprise the salts of free bases having the Formula I with organic and inorganic monobasic and polybasic acids. Advantageously acids such as hydrochloric, hydrobromic, hydriodic, sulfuric, phosphoric, acetic, benzoic, salicylic, glycolic, succinic, nicotinic, ascorbic, tartaric, maleic, malic, lactic, alginic, cyclohexylsulfamic acids, and like pharmacologically acceptable acids are used, especially when the acid addition salt is intended for therapeutic use. The acid addition salts of the invention can be prepared in a convenient manner by reacting stoichiometric proportions of the acid and a free base compound having the Formula I in the presence of a suitable solvent such as water, acetone, dioxane, ethyl acetate, methanol, ethanol, isopropyl alcohol, ether, and the like.

When used in therapy the novel compounds of the invention, in free base form or in the form of pharmacologically acceptable acid addition salts, can be combined with solid or liquid pharmaceutical carriers and formulated in the form of tablets, powder packets, or capsules, using starch and like excipients, or dissolved or suspended in suitable solvents or vehicles, for oral or parenteral administration.

The following examples are illustrative of the process and products of the present invention, but are not to be construed as limiting.

EXAMPLE 1

*1-(o-methoxy-α-methylphenethyl)-2,2 - dimethylhydrazine and the hydrochloride thereof*

A. O-METHOXYPHENYLACETONE 1,1-DIMETHYLHYDRAZONE

A solution of 30.1 g. (0.5 mole) of 1,1-dimethylhydrazine in 75 ml. of methanol was added to a refluxing solution of 82 g. (0.5 mole) of o-methoxyphenylacetone in 150 ml. of methanol. The mixture was heated under reflux for 3 hr. and the solvent was removed by distillation. The residue was distilled under reduced pressure to yield 91 g. of o-methoxyphenylacetone 1,1-dimethylhydrazone having a boiling point of 76 to 79° C. at a pressure of 0.05 mm. of mercury; $n_D^{23}$ 1.5250.

B. 1-(O-METHOXY-α-METHYLPHENETHYL)-2,2-DIMETHYLHYDRAZINE

A solution of 41.2 g. (0.2 mole) of o-methoxyphenylacetone 1,1-dimethylhydrazone in 250 ml. of 95% ethanol and 20 ml. of glacial acetic acid was mixed with 0.5 g. of platinum oxide catalyst and the mixture was shaken in the presence of hydrogen at an initial pressure of 50 p.s.i. The theoretical quantity of hydrogen was taken up in 1.5 hr. The reaction mixture was then filtered and the filtrate was concentrated under reduced pressure. The residue was made alkaline by the addition of an excess of 20% aqueous sodium hydroxide solution and the resulting mixture was extracted with chloroform. The chloroform extract was washed with water and dried over anhydrous sodium sulfate. The dried solution was filtered and the filtrate was evaporated. The residue was distilled under reduced pressure. There was thus obtained 22.1 g. of 1-(o-methoxy-α-methylphenethyl)-2,2-dimethylhydrazine having a boiling point of 73 to 76° C. at a pressure of 0.05 mm. of mercury; $n_D^{25}$ 1.5113.

C. 1-(O-METHOXY-α-METHYLPHENETHYL)-2,2-DIMETHYLHYDRAZINE HYDROCHLORIDE

A solution of 22.1 g. of 1-(o-methoxy-α-methylphenethyl)-2,2-dimethylhydrazine in 200 ml. of anhydrous ether was treated with a slight excess of an ethereal solution of hydrogen chloride. The solid which separated was isolated by filtration, washed with ether, and recrystallized twice from methyl ethyl ketone. There was thus obtained 13 g. of 1-(o-methoxy-α-methylphenethyl)-2,2-dimethylhydrazine hydrochloride in the form of a crystalline solid having a melting point of 154 to 155° C.

*Analysis.*—Calcd. for $C_{12}H_{20}N_2O \cdot HCl$: C, 58.88; H, 8.65; N, 11.45; Cl, 14.49. Found: C, 58.96; H, 8.63; N, 11.24; Cl, 14.31.

EXAMPLE 2

*1-(o-methoxy-α-methylphenethyl)-1,2,2-trimethylhydrazine hydrochloride*

A solution of 4.9 g. (0.02 mole) of 1-(o-methoxy-α-methylphenethyl)-2,2-dimethylhydrazine hydrochloride in a small quantity of water was made alkaline by the addition of an excess of 20% aqueous sodium hydroxide solution and the liberated base was extracted in chloroform. The chloroform extract was washed with water and dried over anhydrous sodium sulfate. The dried solution was filtered and the filtrate was evaporated, the last traces of solvent being removed under reduced pressure. The residue was treated with 3.6 g. (0.044 mole) of 37% aqueous formaldehyde solution and 4.6 g. (0.10 mole) of 98% formic acid. The resulting mixture was heated under reflux for 16 hr., then allowed to cool, made alkaline by the addition of an excess of 20% aqueous sodium hydroxide solution, and the liberated base was extracted in chloroform. The chloroform solution was washed with water and dried over anhydrous sodium sulfate. The dried solution was filtered and the filtrate was evaporated. The residue was dissolved in anhydrous ether and the resulting solution was treated with a slight excess of an ethereal solution of hydrogen chloride. The solid which separated was isolated by filtration, washed with ether and recrystallized twice from ethyl acetate. There was thus obtained 2.7 g. of 1-(o-methoxy-α-methylphenethyl)-1,2,2-trimethylhydrazine hydrochloride in the form of a crystalline solid having a melting point of 99 to 101° C.

*Analysis.*—Calcd. for $C_{13}H_{22}N_2O \cdot HCl$: C, 60.33; H, 8.96; N, 10.83; Cl, 13.70. Found: C, 60.13; H, 8.63; N, 10.90; Cl, 13.51.

EXAMPLE 3

*1-(o-ethoxy-α-methylphenethyl) - 2,2 - dimethylhydrazine and the hydrochloride thereof*

Using the procedure described in Example 1, but substituting o-ethoxyphenylacetone [prepared from o-ethoxybenzaldehyde (Beilsteins Handbuch der Organischen Chemie, vol. 8, p. 43, 1925, 4th Edition) by the method described in U.S. Patent 2,557,051] for o-methoxyphenylacetone in the process of Example 1A, there is prepared 1 - (o-ethoxy-α-methylphenethyl)-2,2-dimethylhydrazine and the hydrochloride thereof.

In similar manner, but replacing o-ethoxyphenylacetone by o-isopropoxyphenylacetone (prepared by treating the sodium derivative of salicylaldehyde with isopropyl bromide and subjecting the o-isopropoxybenzaldehyde so obtained to the process described in U.S. Patent 2,557,051) there is obtained 1 - (o - isopropoxy - α - methylphenethyl)-2,2-dimethylhydrazine and the hydrochloride thereof.

EXAMPLE 4

*1 - (o - methoxy-α-methylphenethyl)-1,2,2-trimethylhydrazine hydrochloride*

A. 1-(O-METHOXY-α-METHYLPHENETHYL)-1-METHYL-HYDRAZINE HYDROCHLORIDE

A solution of 43.2 g. (0.2 mole) of N-[β-(o-methoxyphenyl)isopropyl]methylamine hydrochloride (Heinzelman, supra) in 170 ml. of water was treated with 51 g. of 30% aqueous sulfuric acid solution. The solution so obtained was maintained at 5 to 10° C. and stirred during the addition of a solution of 34 g. (0.5 mole) of sodium nitrite in 60 ml. of water over a period of 30 minutes. After the addition was complete the mixture was stirred for 2 hr. at approximately 20° C. and then extracted with 2 portions, each of 250 ml., of ether. The combined ether extracts were washed with 50 ml. of 40% aqueous potassium hydroxide solution, dried over anhydrous potassium carbonate, and evaporated. There was thus obtained 27.3 g. of N-nitroso-N-methyl-1-(o-methoxyphenyl)-2-propylamine. The latter was dissolved in 300 ml. of anhydrous ether and the solution so obtained was added slowly, over a period of 1 hr., to a stirred solution of 8.7 g. (0.23 mole) of lithium aluminum hydride in 500 ml. of anhydrous ether. After the addition was complete the mixture was stirred and heated under reflux for 1 hr. before being cooled and decomposed by the careful addition of 22 g. (0.25 mole) of ethyl acetate followed by 45 g. (2.5 moles) of water. The resulting mixture was filtered and the filtrate was dried over anhydrous magnesium sulfate. The dried solution was filtered and the filtrate was evaporated. The residue was distilled in vacuo. There was thus obtained 15.6 g. of 1-(o-methoxy-α-methylphenethyl)-1-methylhydrazine in the form of an oil having a boiling point of 85° to 100° C. at a pressure of 0.06 to 0.07 mm. of mercury. The oil so obtained was dissolved in anhydrous ether and the ethereal solution was treated with a slight excess of an ethereal solution of hydrogen chloride. The solid which separated was isolated by filtration and was recrystallized from ethyl acetate and then from isopropyl alcohol. There was thus obtained 8.5 g. of 1-(o-methoxy-α-methylphenethyl)-1-methylhydrazine hydrochloride in the form of a crystalline solid having a melting point of 141 to 142° C.

*Analysis.*—Calcd. for $C_{11}H_{18}N_2O \cdot HCl$: C, 57.25; H, 8.30; N, 12.14; Cl, 15.37. Found: C, 57.44; H, 8.16; N, 12.14; Cl, 15.36.

B. 1-(O-METHOXY-α-METHYLPHENETHYL)-1,2,2-TRIMETHYL-HYDRAZINE HYDROCHLORIDE

A solution of 4.61 g. (0.02 mole) of 1-(o-methoxy-α-methylphenethyl)-1-methylhydrazine hydrochloride in a small quantity of water was made alkaline by the addition of an excess of 20% aqueous sodium hydroxide solution and the liberated base was extracted in chloroform. The chloroform extract was washed with water and dried over anhydrous sodium sulfate. The dried solution was filtered and the filtrate was evaporated, the last traces of solvent being removed under reduced pressure. The residue was treated with 7.2 g. (0.088 mole) of 37% aqueous formaldehyde solution and 9.2 g. (0.20 mole) of 98% formic acid and the mixture was heated under reflux until no more carbon dioxide was evolved. The cooled reaction mixture was made alkaline by the addition of an excess of 20% aqueous sodium hydroxide solution and the base so liberated was extracted in chloroform. The chloroform extract was washed with water and dried over anhydrous sodium sulfate. The dried solution was filtered and the filtrate was evaporated. The residue was dissolved in anhydrous ether and the ethereal solution was treated with a slight excess of an ethereal solution of hydrogen chloride. The solid which separated was isolated by filtration, washed with ether, and recrystallized twice from ethyl acetate. There was thus obtained 1-(o-methoxy - α - methylphenethyl)-1,2,2 - trimethylhydrazine hydrochloride in the form of a crystalline solid identical with the material prepared as described in Example 2.

EXAMPLE 5

*1-(o-methoxy-α-methylphenethyl)-1-isopropyl-2,2-dimethylhydrazine hydrochloride*

Using the procedure described in Example 4A, but substituting N - [β - (o-methoxyphenyl)isopropyl]isopropylamine hydrochloride (Heinzelman, supra) for N-[β-(o-methoxyphenyl)isopropyl]methylamine hydrochloride, there is obtained 1-(o-methoxy-α-methylphenethyl)-1-isopropylhydrazine hydrochloride. The latter compound is converted to 1-(o-methoxy-α-methylphenethyl)-1-isopropyl-2,2-dimethylhydrazine hydrochloride using the procedure described in Example 4B.

In similar manner N-[β-(o-ethoxyphenyl)isopropyl]methylamine hydrochloride (prepared from o-ethoxyphenylacetone and methylamine using the process described by Heinzelman, supra) is converted by the process described in Example 4A to 1-(o-ethoxy-α-methylphenethyl)-1-methylhydrazine hydrochloride. The latter compound is then converted, using the process described in Example 4B, to 1-(o-ethoxy-α-methylphenethyl)-1,2,2-trimethylhydrazine hydrochloride.

I claim:

1. A compound selected from the class consisting of (*a*) a compound having the general formula:

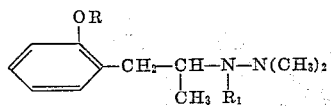

wherein R represents alkyl containing from 1 to 3 carbon atoms, inclusive, and $R_1$ is selected from the class consisting of hydrogen and alkyl containing from 1 to 3 carbon atoms, inclusive, and (*b*) the pharmacologically acceptable acid addition salts thereof.

2. 1 - (o-methoxy-α-methylphenethyl)-2,2-dimethylhydrazine.

3. 1 - (o-methoxy-α-methylphenethyl)-2,2-dimethylhydrazine hydrochloride.

4. 1 - (o-methoxy-α-methylphenethyl)-1,2,2-trimethylhydrazine.

5. 1 - (o-methoxy-α-methylphenethyl)-1,2,2-trimethylhydrazine hydrochloride.

References Cited in the file of this patent
UNITED STATES PATENTS 2,305,748    Vargha _____ Dec. 22, 1942
2,802,031    Horvitz _____ Aug. 6, 1957

OTHER REFERENCES

Karrer: "Organic Chemistry," 4 Eng. ed., Elsevier Pub. Co., New York, page 130 (1950).

Byrkit et al.: Industrial and Eng. Chem., vol. 42, pages 1863 to 1865 (1950).